US008324565B2

(12) United States Patent
Mordehai et al.

(10) Patent No.: US 8,324,565 B2
(45) Date of Patent: Dec. 4, 2012

(54) ION FUNNEL FOR MASS SPECTROMETRY

(75) Inventors: Alexander Mordehai, Santa Clara, CA (US); Mark H. Werlich, Los Altos, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 422 days.

(21) Appl. No.: 12/640,089

(22) Filed: Dec. 17, 2009

(65) Prior Publication Data

US 2011/0147575 A1 Jun. 23, 2011

(51) Int. Cl.
*B01D 59/44* (2006.01)
*H01J 49/00* (2006.01)

(52) U.S. Cl. ........ 250/281; 250/282; 250/288; 250/289; 250/290; 250/291; 250/292

(58) Field of Classification Search ................. 250/281, 250/282, 288–292
See application file for complete search history.

(56) References Cited

U.S. PATENT DOCUMENTS 6,107,628 A 8/2000 Smith et al.
6,583,408 B2 6/2003 Smith et al.
6,707,037 B2 * 3/2004 Whitehouse .................. 250/288
7,042,972 B2 5/2006 Fahim
7,495,212 B2 2/2009 Kim et al.
2006/0108520 A1 5/2006 Park et al.
2009/0218486 A1 * 9/2009 Whitehouse et al. ......... 250/288
2009/0242755 A1 10/2009 Tang et al.

FOREIGN PATENT DOCUMENTS

GB 2309580 7/1997
GB 2324906 11/1998
GB 2346730 8/2000
JP 2005251546 9/2005

OTHER PUBLICATIONS

GB Search Report dated Mar. 29, 2011 for Application No. GB1018609.6.

* cited by examiner

*Primary Examiner* — Jack Berman
*Assistant Examiner* — Meenakshi Sahu

(57) ABSTRACT

An interface for use in a mass spectrometer is disclosed. The interface comprises a first ion funnel comprising a first inlet and a first outlet, and a first axis between the first inlet and the first outlet. The interface further comprises a second ion funnel in tandem with the first ion funnel, the second ion funnel comprising a second inlet and a second outlet, and a second axis between the second inlet and the second outlet. The first axis and the second axis are offset relative to one another. A mass spectrometer comprising the interface and a method are disclosed.

20 Claims, 5 Drawing Sheets

103

ION FUNNEL FOR MASS SPECTROMETRY

BACKGROUND

Chemical and biological separations are routinely performed in various industrial and academic settings to determine the presence and/or quantity of individual species in complex sample mixtures. There exist various techniques for performing such separations.

Mass spectrometry (MS) is an analytical methodology used for quantitative chemical analysis of samples. Molecules in a sample are ionized and separated by a spectrometer based on their respective masses. The separated analyte ions are then detected and a mass spectrum of the sample is produced. The mass spectrum provides information about the masses and in some cases the quantities of the various analyte particles that make up the sample. In particular, mass spectrometry can be used to determine the molecular weights of molecules and molecular fragments within an analyte. Additionally, mass spectrometry can identify components within the analyte based on a fragmentation pattern.

Analyte ions for analysis by mass spectrometry may be produced by any of a variety of ionization systems. For example, Atmospheric Pressure Matrix Assisted Laser Desorption Ionization (AP-MALDI), Atmospheric Pressure Photoionization (APPI), Electrospray ionization (ESI), Atmospheric Pressure Chemical Ionization (APCI) and Inductively Coupled Plasma (ICP) systems may be employed to produce ions in a mass spectrometry system. Many of these systems generate ions at or near atmospheric pressure (760 Torr). Once generated, the analyte ions must be introduced or sampled into a mass spectrometer. Typically, the analyzer section of a mass spectrometer is maintained at high vacuum levels from $10^{-4}$ Torr to $10^{-8}$ Torr. In practice, sampling the ions includes transporting the analyte ions in the form of a narrowly confined ion beam from the ion source to the high vacuum mass spectrometer chamber by way of one or more intermediate vacuum chambers. Each of the intermediate vacuum chambers is maintained at a vacuum level between that of the proceeding and following chambers. Therefore, the ion beam transports the analyte ions transitions in a stepwise manner from the pressure levels associated with ion formation to those of the MASS spectrometer. In most applications, it is desirable to transport ions through each of the various chambers of a mass spectrometer system without significant ion loss. Often an ion guide is used to move ions in a defined direction in the MS system.

Ion guides typically utilize electromagnetic fields to confine the ions radially while allowing or promoting ion transport axially. One type of ion guide generates a multipole field by application of a time-dependent voltage, which is often in the radio frequency (RF) spectrum. These so-called RF multipole ion guides have found a variety of applications in transferring ions between parts of MS systems, as well as components of ion traps. When operated in the presence of a buffer gas, RF guides are capable of reducing the velocity of ions in both axial and radial directions. This reduction in ion velocity in the axial and radial directions is known as "thermalizing" or "cooling" the ions ion populations due to multiple collisions of ions with neutral molecules of the buffer gas. Thermalized beams that are compressed in the radial direction are useful in improving ion transmission through orifices of the MS system and reducing radial velocity spread in time-of-flight (TOF) instruments. RF multipole ion guides create a pseudo potential well, which confines ions inside the ion guide. Typically ion guide operation is limited to pressures below approximately 1 Torr due to problems with ion stagnation inside of the ion guides at higher pressures.

Certain known ion funnel ion optics were developed to overcome the pressure limitations of the certain known ion guides by providing both radial confinements with an RF electrical field and axial acceleration with an electrostatic electrical field. Both the RF and electrostatic fields are generated by an array of concentric rings with progressively reduced ID. Ion funnels can efficiently focus and transfer ions from the entrance to the exit, however neutrals that are embedded into the gas flow also can be transmitted efficiently from the entrance to the exit. Since ion funnels can operate at higher pressures compared to known ion guides, and neutral particle transport is defined by the pressure and flow of the gas inside of the funnel, the problem of separating neutral particles ("neutrals") from ions become even more actual.

In a known ion funnel, the separation of ions and neutrals is addressed within the ion funnel device by providing an additional central electrode designed to block the path of the neutrals and by supplying an additional voltage to this electrode to divert ions around the central electrode. While this known ion funnel may usefully separate ions and neutrals, the complexity of the additional electrode and additional power supply is not desirable. Moreover, the stability and reliability of such an ion funnel also are problematic due to the contamination on the additional electrode, which results in the charging of the additional electrode and a need to adjust its DC voltage with time.

What is needed, therefore, is a method and apparatus for providing analytes from an ion source to a mass analyzer that overcomes at least the drawbacks of known devices and methods described above.

BRIEF DESCRIPTION OF THE DRAWINGS

The present teachings are best understood from the following detailed description when read with the accompanying drawing figures. The features are not necessarily drawn to scale. Wherever practical, like reference numerals refer to like features.

DEFINED TERMINOLOGY

It is to be understood that the terminology used herein is for purposes of describing particular embodiments only, and is not intended to be limiting.

As used in the specification and appended claims, the terms 'a', 'an' and 'the' include both singular and plural referents, unless the context clearly dictates otherwise. Thus, for example, 'a device' includes one device and plural devices.

As used in the specification and appended claims, and in addition to their ordinary meanings, the terms 'substantial' or 'substantially' mean to with acceptable limits or degree. For example, 'substantially cancelled' means that one skilled in the art would consider the cancellation to be acceptable.

As used in the specification and the appended claims and in addition to its ordinary meaning, the term 'approximately' means to within an acceptable limit or amount to one having ordinary skill in the art. For example, 'approximately the same' means that one of ordinary skill in the art would consider the items being compared to be the same.

DETAILED DESCRIPTION

In the following detailed description, for purposes of explanation and not limitation, embodiments disclosing specific details are set forth in order to provide a thorough understanding of the present teachings. Descriptions of known systems, devices, materials, methods of operation and methods of manufacture may be omitted so as to avoid obscuring the description of the example embodiments. Nonetheless, systems, devices, materials and methods that are within the purview of one of ordinary skill in the art may be used in accordance with the embodiments.

Figure 1:
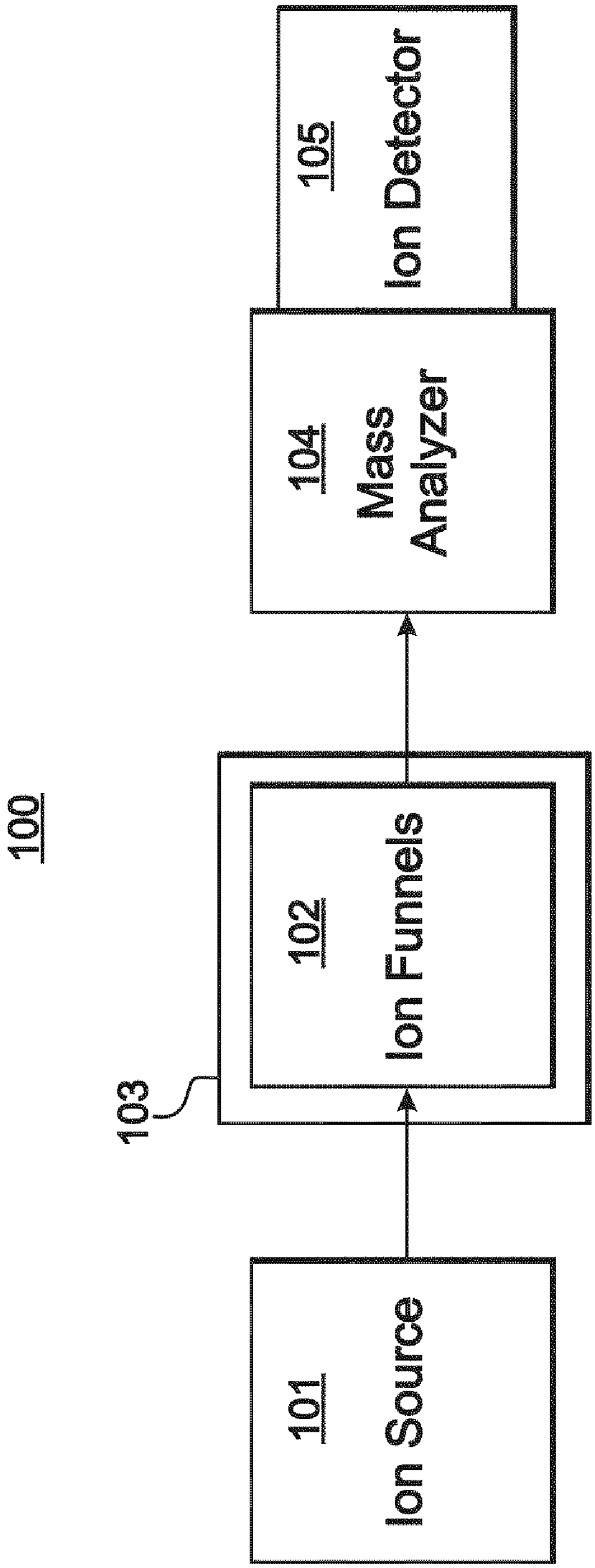
FIG. 1 is a simplified schematic diagram of a mass spectrometer in accordance with an embodiment.

FIG. 1 shows a simplified block diagram of an MS system 100 in accordance with an embodiment. The MS system 100 comprises an ion source 101, ion funnels 102, an interface 103, a mass analyzer 104 and an ion detector 105. The ion source 101 may be one of a number of known types of ion sources. The mass analyzer 104 may be one of a variety of known mass analyzers including hut not limited to a time-of-flight (TOF) instrument, a Fourier Transform MS analyzer (FTMS), an ion trap, a quadrupole mass analyzer, a magnetic sector analyzer, or any practical combination thereof, Similarly, the ion detector 105 is one of a number of known ion detectors.

The ion funnels 102 are described more fully below in connection with certain embodiments. The ion funnels 102 may be provided in the interface 103 which is configured to provide one or more pressure transition stages that lie between the ion source 101 and the mass analyzer 104. The ion source 101 is normally maintained at or near atmospheric pressure, and the mass analyzer 104 is normally maintained at comparatively high vacuum. According to certain embodiments, the ion funnels 102 may be configured to transition from comparatively high pressure to comparatively low pressure. The ion source 101 may be one of a variety of known ion sources. Downstream from the ion source 101 there may also be additional ion manipulation devices and vacuum partitions (not shown), including but not limited to skimmers, apertures, small diameter conduits, and other ion optics. In use, ions (the path of which is shown by arrows) produced in ion source 101 are provided to the ion funnels 102. The ion funnels 102 move the ions towards the mass analyzer 104 and form a comparatively confined beam having a defined phase space. Notably, and as described more fully below, neutral particles generally will not follow the path of the ions and are substantially separated from the ions prior to exiting the ion funnels 102 and are substantially prevented from entering the mass analyzer 104. As such, the ion beam emerges from the ion funnels 102 and is introduced into the mass analyzer 104. The ions pass from mass analyzer 104 to the ion detector 105, where the ions are detected.

Figure 2A:
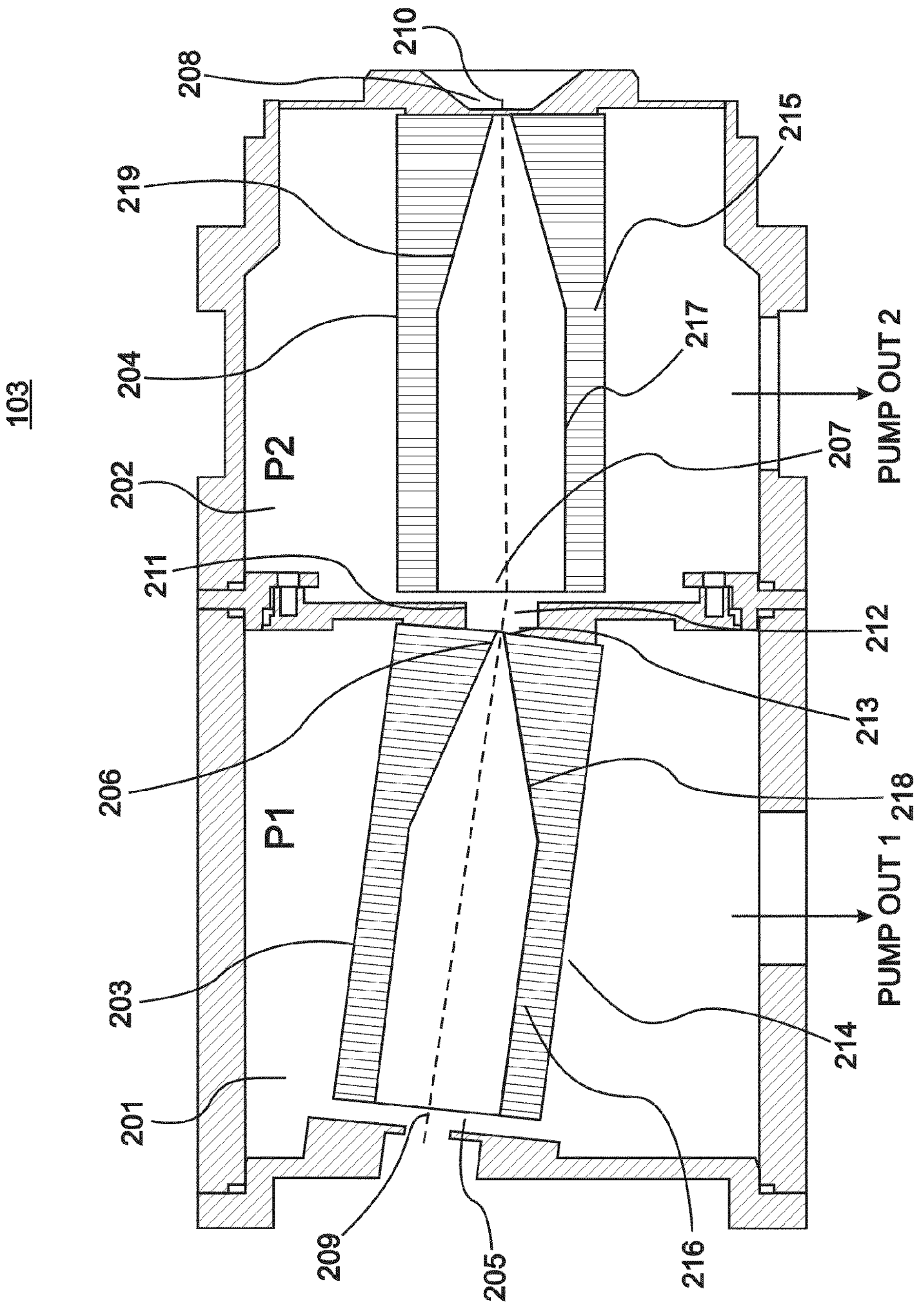
FIG. 2A shows a cross-sectional view of an interface for a MS device in accordance with an embodiment.
Figure 2B:
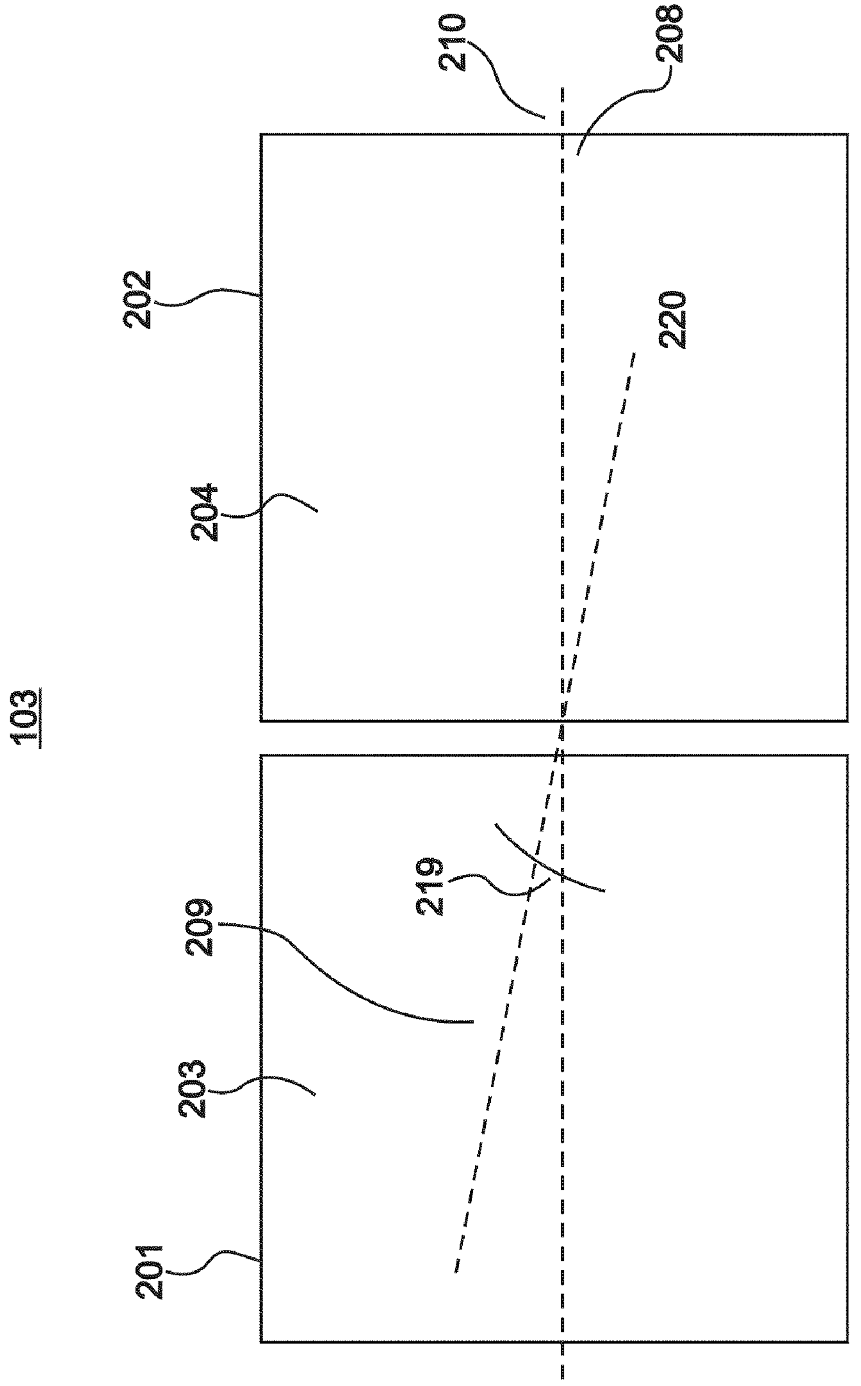
FIG. 2B shows a simplified schematic representation of the interface of FIG. 2A.

FIG. 2A shows a cross-sectional view of the interface 103 in accordance with an embodiment. The interface 103 comprises a first chamber 201 and a second chamber 202. Illustrative the first and second chambers 201, 202 are differentially pumped vacuum chambers, with the ambient pressure at the ion source 101 being approximately atmospheric pressure. The first chamber 201 is maintained at a first pressure $P_1$ and the second chamber 202 is maintained at a second pressure $P_2$ where $P_1>P_2$. Illustratively, the first pressure $P_1$ is maintained in the range of approximately 2 Torr to approximately 100 Torr and the second pressure $P_2$ is maintained in the range of approximately 0.1 Torr to approximately 10 Torr. In one illustrative embodiment, $P_1$ is 10 Torr, and $P_2$ is 3 Torr. It is emphasized that the range of pressures for the first pressure $P_1$ and the second pressure $P_2$ are illustrative and other pressure ranges are contemplated.

A first ion funnel 203 is provided in the first chamber 201, and a second ion funnel 204 is provided in the second chamber 202. The first ion funnel 203 is in tandem with the second ion funnel 204. Illustratively, the first and second ion funnels 203, 204 may be immediately in tandem with no other elements therebetween, or the ion funnels may be in tandem with other elements (e.g., ion optics) disposed therebetween.

The first ion funnel 203 comprises a first inlet 205 and a first outlet 206, and the second ion funnel 204 comprises a second inlet 207 and a second outlet 208. A first axis 209 extends from the first inlet 205 to the first outlet 206, and a second axis 210 extends from the second inlet 207 and the second outlet 208. In this embodiment the first outlet 206 serves as a conductance limit between the first chamber 201 and the second chamber 202, and at the same time is the last active element of the first ion funnel 203 with RF voltage applied thereto. Having an RF voltage on the conductance limit prevents charging and therefore improves the stability of ion transmission through the interface 103.

The first outlet 206 is disposed adjacent to an opening 211 in a partition 212 between the first chamber 201 and the second chamber 202; and the second inlet 207 is disposed on an opposing side adjacent to the opening 211 in the partition 212. In an illustrative embodiment, an electrostatic drift tube device 213 is provided in the opening 211 in the partition 212. As described more fully herein, the electrostatic drift tube device 213 may be used to accelerate ions through the opening 211 and from the first outlet 206 and into the second inlet 207. The electrostatic drift tube device 213 may comprise known ion optics, such as typical drift ion optics with several electrodes and accelerating potential difference between them.

The first ion funnel 203 is illustratively a segmented ion funnel comprising a plurality of electrodes 214. Similarly the second ion funnel 204 is illustratively a segmented ion funnel comprising a plurality of electrodes 215. Many details of segmented ion funnels comprising a plurality of electrodes may be found in U.S. Pat. Nos. 6,107,628 to Smith, et al.; 6,583,408 to Smith, et al.; and U.S. Pat. No. 7,495,212 to Kim, et al. The respective entire disclosures of the Smith, et al. patents and the Kim, et al. patent are specifically incorporated herein by reference. Other known ion funnels can also be employed.

The electrodes 214, 215 are illustratively substantially circular in cross-section; however the cross-section of the electrodes may be of another, such as an elliptical cross-section. In an embodiment, the first ion funnel 203 and the second ion funnel 204 each comprise regions closest to their respective first and second inlets 205, 207 that are substantially cylindrical and regions closest to their respective outlets that are substantially conical. For example, the first ion funnel 203 comprises a region 216, which is substantially cylindrical adjacent to the first inlet 205; and the second ion funnel 204 comprises a region 217, which is substantially cylindrical adjacent to the second inlet 207. Moreover, the first ion funnel 203 comprises a region 218, which is substantially conical adjacent to the first outlet 206; and the second ion funnel 204 comprises a region 219, which is substantially conical adjacent to the second outlet 208. Thus, in certain embodiments, the electrodes 214, 215 are substantially circular having a substantially constant radius in regions 216, 217; and the electrodes 214, 215 are substantially circular having successively smaller radii in regions 218, 219 with the smallest radii being closest to respective first and second outlets 206, 208. It is emphasized that the configuration of the electrodes 214, 215 shown in and described in connection with the first and second ion funnels 203, 204 are intended to be illustrative and in no sense limiting of the present teachings. Other configurations are contemplated. For example, the electrodes 214, 215 may be continuously converging from respective first and second inlets 205, 207 to respective first and second outlets 206, 208 along their respective lengths. RF and DC fields are generated in the first ion funnel 203 and the second ion funnel 204. These fields are established to guide ions along a trajectory parallel to the first axis 209 in the first ion funnel 203 and along a trajectory parallel to the second axis 210 in the second ion funnel 204. In certain embodiments, the first ion funnel 203 is substantially symmetric along its length about the first axis 209, and the second ion funnel 204 is substantially symmetric about second axis 210 along its length.

Turning to FIG. 213, a simplified schematic representation of the interface 103 is shown to illustrate the angular relationship between the first ion funnel 203 and the second ion funnel 204 of an embodiment. The first ion funnel 203 is offset at an angle relative to the second ion funnel 204 so that the first axis 209 is at an angle 219 relative to the second axis 210. In accordance with certain embodiments, the angle 219 is selected to be in the range of approximately 2° to approximately 30°. It is emphasized that the range of the angle 219 is intended to be illustrative, and that the angle may be an angle within this range selected to improve the throughput of ions, and reduce the throughput of neutrals from the first inlet 205 and the second outlet 208.

Ions traveling through the first ion funnel 203 be guided by the potential field along a trajectory parallel to the first axis 209. Neutrals are also guided along a trajectory parallel to the first axis 209 by the pressure differential created between the first chamber 201 and the second chamber 202. Similarly, ions that traverse the opening 211 in the partition 212 enter the second ion funnel 204 and are guided along the second axis 210. However, neutrals are not influenced by the electric fields of either the first ion funnel 203 or the second ion funnel 204, but rather are only propelled due to the pressure differential created between the first chamber 201 and the second chamber 202. As a result, the neutrals are not redirected from their trajectory along the first axis 209 to a trajectory along the second axis 210, but rather are transmitted through the partition 212 and into the second ion funnel along a trajectory parallel to the first axis 209. Moreover, the neutrals are incident at a region 220 along an interior surface formed by the electrodes 215 of the second ion funnel 204. Notably, the neutrals are deposited in an asymmetric manner along the electrodes 215 in the region 220 (along a side of the cylinder or cone, or both, formed by the segmented electrodes 215) and are not generally evenly distributed across the electrodes.

The asymmetric collection of neutrals at the region 220 creates an insulator or dielectric layer on the electrodes 215 in the region 220. As should be appreciated, a small portion of ions traveling through the second ion funnel near region 220 will also be incident along the region 220. Because of the dielectric or insulative layer created in the region 220, these ions will repel the main ion population away from the contaminated region 220 and, therefore will more abundantly transfer the main ion population to the second outlet 208 of the second ion funnel 204. Ultimately, this improves the stability of ion throughput to the mass analyzer 104 and renders the mass analyzer 104 less sensitive to contamination.

It is emphasized that the present teachings are not limited to the use of two ion funnels (e.g., first ion funnel 203 and second ion funnel 204), or to a single ion funnel in each chamber. For example, a third ion funnel disposed in a third chamber (not shown) is contemplated. The third chamber may be provided adjacent to the second chamber 202, and in tandem with the second chamber 202, and the first chamber 201. The offset of the axis of the third chamber would be either angular or lateral relative to second axis 210. In this arrangement the third chamber is maintained at a third pressure ($P_3$), which is lower than the second pressure $P_2$. Alternatively, the third chamber may be provided adjacent to the first ion funnel 203 and in tandem with the first ion funnel 203 and the second ion funnel 204. In this arrangement, the third chamber is maintained at a third pressure $P_3$, which is higher than the second pressure $P_2$. The offset of the axis of the third chamber would be either angular or lateral relative to first axis 209.

Figure 3:
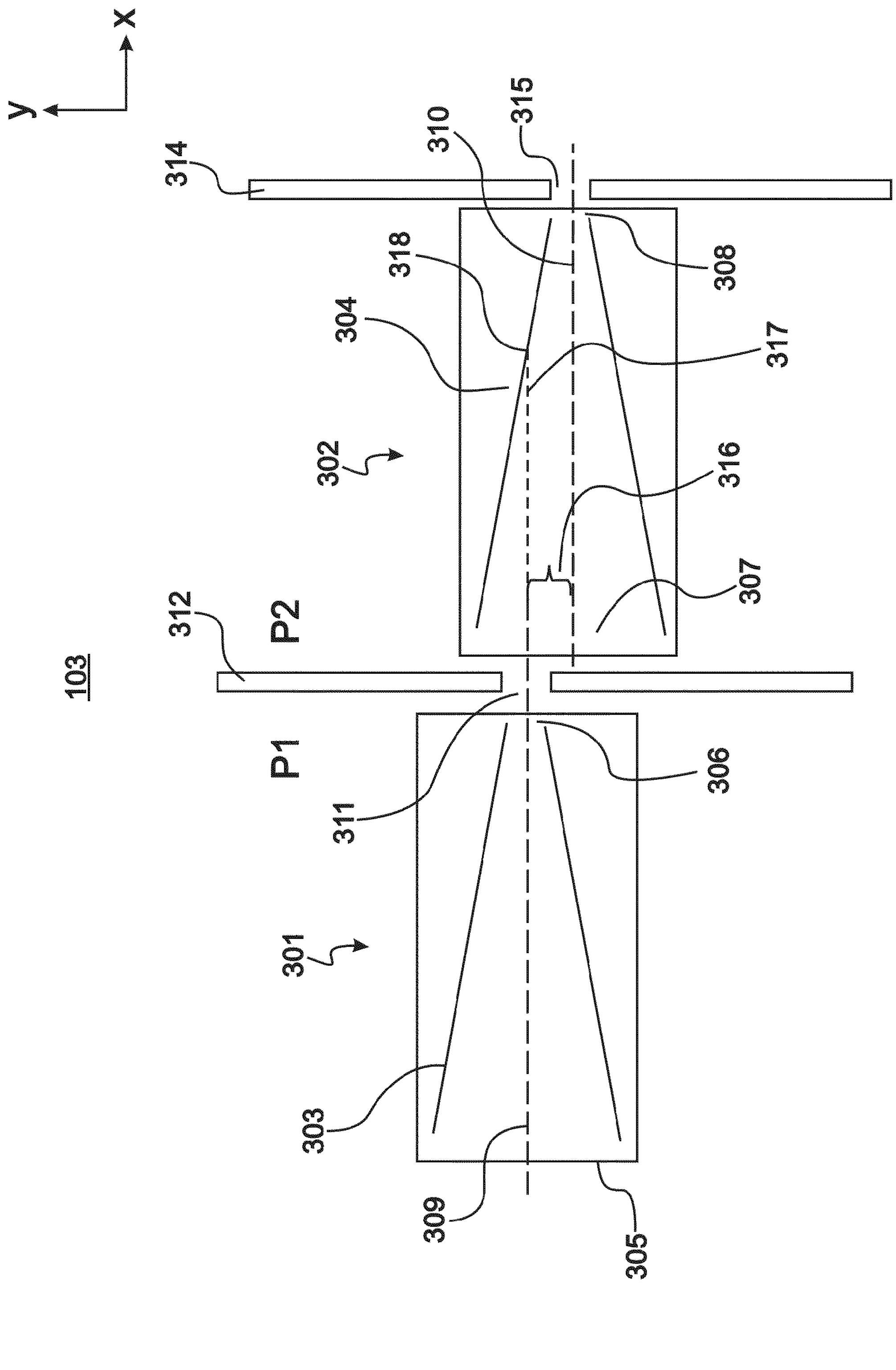
FIG. 3 shows a cross-sectional view of an interface for a MS device in accordance with an embodiment.

FIG. 3 shows a cross-sectional view of the interface 103 for a MS device in accordance with an embodiment. Many of the details of the interface 103 described in connection with FIG. 3 are common to those provided in the description of FIGS. 1 and 2A, and are not repeated to avoid obscuring the description of the presently described embodiments.

The interface 103 comprises a first chamber 301 and a second chamber 302. Illustratively, the first and second chambers 301, 302 are differentially pumped vacuum chambers. As in the previously described embodiments, the first chamber 301 is maintained at a first pressure $P_1$ and the second chamber 302 is maintained at a second pressure $P_2$ where $P_1>P_2$. A first ion funnel 303 is provided in the first chamber 301, and a second ion funnel 304 is provided in the second chamber 302. The first and second ion funnels 303, 304 are segmented ion funnels comprising a plurality of electrodes, such as described above in connection with FIG. 2A. Moreover, the first and second ion funnels 303, 304 may comprise cylindrical portions and conical portions, or conical portions as described above.

The first ion funnel 303 comprises a first inlet 305 and a first outlet 306, and the second ion funnel 304 comprises a second inlet 307 and a second outlet 308. A first axis 309 extends from the first inlet 305 to the first outlet 306, and a second axis 310 extends from the second inlet 307 and the second outlet 308. The first outlet 306 is disposed adjacent to an opening 311 in a partition 312 between the first chamber 301 and the second chamber 302; and the second inlet 307 is disposed on an opposing side adjacent to the opening 311 in the partition 312. The first outlet 306 and the opening 311 are substantially circular in cross-section. The smaller of the first outlet 306 or the opening 311, serves as the conductance limit between first and second chambers 301 and 302. The radius of the conductance limit is defined as $r_1$. In the embodiment, the second inlet 307 is substantially circular and has a radius $r_2$. The second outlet 308 is disposed adjacent to a partition 314 and is substantially aligned to an opening 315 therein. In an embodiment the partition 312 has a DC potential that is set to be in between of the DC potential for the first outlet 306 of the first ion funnel 303 and the second inlet 307 potential of the second ion funnel 304 to accelerate ions in the direction towards the second inlet 307 of the second ion funnel.

RF and DC fields are generated in the first ion funnel 303 and the second ion funnel 304. These fields are established to guide ions along a trajectory parallel to the first axis 309 in the first ion funnel 303 and along a trajectory parallel to the second axis 310 in the second ion funnel 304. In certain embodiments, the first ion funnel 303 is substantially symmetric along its length about the first axis 309, and the second ion funnel 304 is substantially symmetric about second axis 310 along its length.

The first ion funnel 303 is offset laterally relative to the second ion funnel 304 so that the first axis 309 is substantially parallel to but offset by a distance 316 from the second axis 310. The offset of the second ion funnel 304 to the first ion funnel 303 is in the negative y-direction according to the coordinate system shown in FIG. 3. This is merely illustrative, and the offset of the second ion funnel 304 could be in the positive y-direction. Generally, the offset distance 316 is greater than the radius $r_1$ and less than the radius $r_2$. Notably, the offset distance 316 can be in any radial direction from the first axis 309. It should be appreciated that with a lateral offset, the first axis 309 does not have to be substantially parallel to the second axis 310.

Ions traveling through the first ion funnel 303 will be guided by the potential field along a trajectory parallel to the first axis 309. Neutrals are also guided along a trajectory parallel to the first axis 309 by the pressure differential created between the first chamber 301 and the second chamber 302. Similarly, ions that traverse the opening 311 in the partition 312 enter the second ion funnel 304 and are guided along the second axis 310. Thus, the trajectory of the ions is offset by the distance 316 as a result of the relative shift in the electric field of the second ion funnel 304 relative to the electric field of the first ion funnel 303. However, neutrals are not influenced by the electric fields of either the first ion funnel 303 or the second ion funnel 304, but rather are only propelled due to the pressure differential created between the first chamber 301 and the second chamber 302. As a result, the neutrals are not redirected from their trajectory along the first axis 309 to a trajectory along the second axis 310, but rather are transmitted through the partition 312 and into the second ion funnel 304 and laterally offset relative to the second axis 310. Moreover, and as depicted in FIG. 3, the neutrals travel along trajectory 317 and are incident along an interior surface 318 formed by the electrodes of the second ion funnel 304. Notably, the neutrals are deposited in an asymmetric manner along the electrodes in the interior surface 318 (along a side of the cylinder or cone, or both, formed by the segmented electrodes of the second ion funnel 304) and are not generally evenly distributed across the electrodes.

The asymmetric collection of neutrals at the interior surface 318 creates an insulator or dielectric layer on the electrodes of the second ion funnel 304 in the interior surface 318. As should be appreciated, a small portion of ions traveling through the second ion funnel near interior surface 318 will also be incident along the interior surface 318. Because of the dielectric insulative layer created in the interior surface 318, these ions will repel the main ion population away from the contaminated interior surface 318 and, therefore will more abundantly transfer the main ion population to the second outlet 308. Ultimately, this improves the stability of ion throughput to the mass analyzer and renders the mass analyzer 104 less sensitive to contamination.

Figure 4:
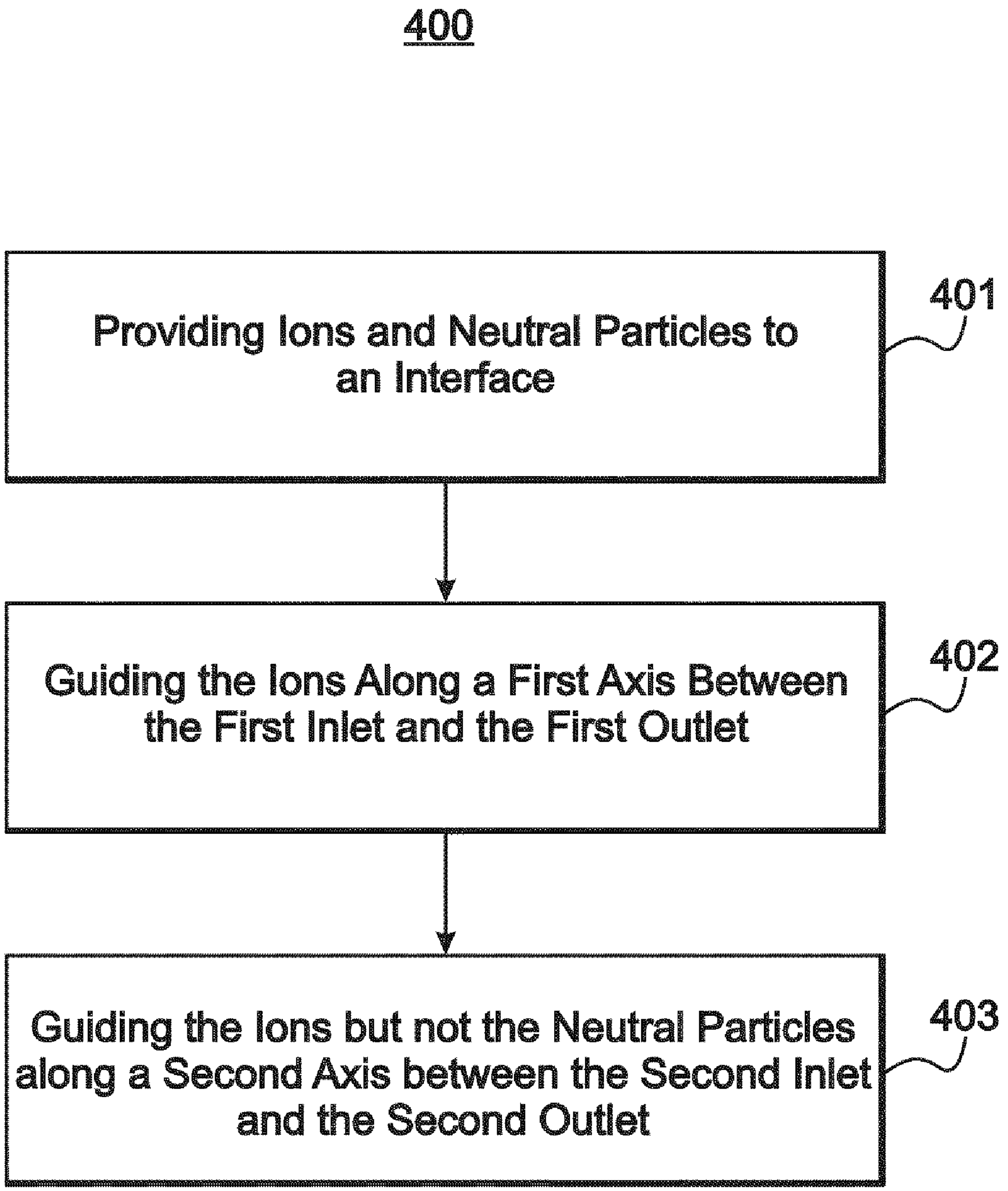
FIG. 4 illustrates a flow-diagram of a method of separating ions and neutral particles according to an embodiment.

FIG. 4 illustrates a flow-diagram of a method 400 of separating ions and neutral particles according to an embodiment. The method may be carried out with the interface 103 described above. At 401 the method comprises providing the ions and neutral particles to an interface. The interface comprises a first ion funnel comprising a first inlet and a first outlet; and a second ion funnel in tandem with the first ion funnel comprising a second inlet and a second outlet. As described in connection with embodiments above, the axis of the first ion funnel and the axis of the second ion funnel are offset. At 402, the method comprises guiding the ions along a first axis between the first inlet and the first outlet. At 403 the method comprises guiding the ions but not the neutral particles along a second axis between the second inlet and the second outlet.

view of this disclosure it is noted that the methods and devices can be implemented in keeping with the present teachings. As described in connection with embodiments above, the axis of the first ion funnel and the axis of the second ion funnel are offset and the offset may be an angular offset, or may be a lateral offset. The offset may be both an angular offset and a lateral offset. The various components, materials, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

The invention claimed is:

1. An interface for use in a mass spectrometer, the interface comprising:

a first ion funnel comprising a first inlet and a first outlet, and a first axis between the first inlet and the first outlet; and a second ion funnel in tandem with the first ion funnel, the second ion funnel comprising a second inlet and a second outlet, and a second axis between the second inlet and the second outlet, the first axis and the second axis being offset relative to one another, wherein neutral particles are deposited on an inner surface of the second ion funnel.

2. An interface as claimed in claim 1, wherein the offset comprises an angular offset.

3. An interface as claimed in claim 1, wherein the offset comprises a lateral offset.

4. An interface as claimed in claim 2, wherein an angle of the angular offset is at least approximately 2° and at most approximately 30°.

5. An interface as claimed in claim 1, further comprising a first chamber configured to maintain a first pressure and a second chamber configured to maintain a second pressure.

6. An interface as claimed in claim 5, wherein the first ion funnel is disposed in the first chamber and the second ion funnel is disposed in the second chamber.

7. An interface as claimed in claim 6, wherein the first pressure is greater than the second pressure.

8. An interface as claimed in claim 1, further comprising ion optics disposed between the first outlet and the second inlet.

9. An interface as claimed in claim 3, wherein the first axis and the second axis are substantially parallel and the lateral offset is greater than a radius of a conductance limit between the first chamber and the second chamber and less than a radius of the second inlet of the second ion funnel.

10. A mass spectrometer, comprising:

an ion source;

a mass analyzer; and an interface for the mass spectrometer disposed between the ion source and the mass analyzer, wherein the interface comprises: a first ion funnel comprising a first inlet and a first outlet, and a first axis between the first inlet and the first outlet; and a second ion funnel in tandem with the first ion funnel, the second ion funnel comprising a second inlet and a second outlet, and a second axis between the second inlet and the second outlet, the first axis and the second axis being offset relative to one another, wherein neutral particles are deposited on an inner surface of the second ion funnel.

11. A mass spectrometer as claimed in claim 10, wherein the offset comprises an angular offset.

12. A mass spectrometer as claimed in claim 10, wherein the offset comprises a lateral offset.

13. A mass spectrometer as claimed in claim 11, wherein an angle of the angular offset is at least approximately 2° and at most approximately 30°.

14. A mass spectrometer as claimed in claim 12, wherein the first axis and the second axis are substantially parallel and the lateral offset is greater than a radius of a conductance limit between the first chamber and the second chamber and less than a radius of the second inlet of the second ion funnel.

15. A mass spectrometer as claimed in claim 10, further comprising a first chamber configured to maintain a first pressure and a second chamber configured to maintain a second pressure.

16. A mass spectrometer as claimed in claim 15, wherein the first ion funnel is disposed in the first chamber and the second ion funnel is disposed in the second chamber.

17. A mass spectrometer as claimed in claim 16, wherein the first pressure is greater than the second pressure.

18. A method of separating ions and neutral particles in a mass spectrometer, the method comprising:

providing the ions and neutral particles to an interface, comprising: a first ion funnel comprising a first inlet and a first outlet, and a first axis between the first inlet and the first outlet; and a second ion funnel in tandem with the first ion funnel, the second ion funnel comprising a second inlet and a second outlet, and a second axis between the second inlet and the second outlet, wherein the first axis and the second axis are offset relative to one another;

guiding the ions along a first axis between the first inlet and the first outlet;

guiding the ions but not the neutral particles along a second axis between the second inlet and the second outlet; and depositing the neutral particles on an inner surface of the second ion funnel.

19. A method as claimed in claim 18, wherein the offset if an angular offset.

20. A method as claimed in claim 18, wherein the offset is a lateral offset.

* * * * *